No Printed Specification Available

9288X

C. Lane,

Fire Place & Grate

Patented Dec. 15. 1835.

Horizontal Section

12887 Dec. 15. 1835

Charles Lane. Hingham Massachusetts

Letters Patent

Figure 1:
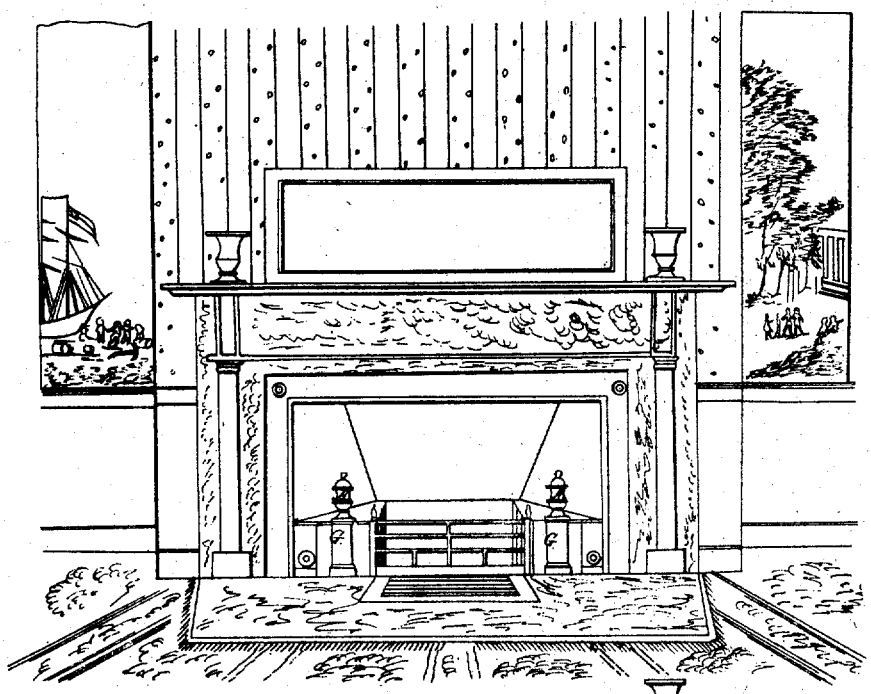
Figure 2:
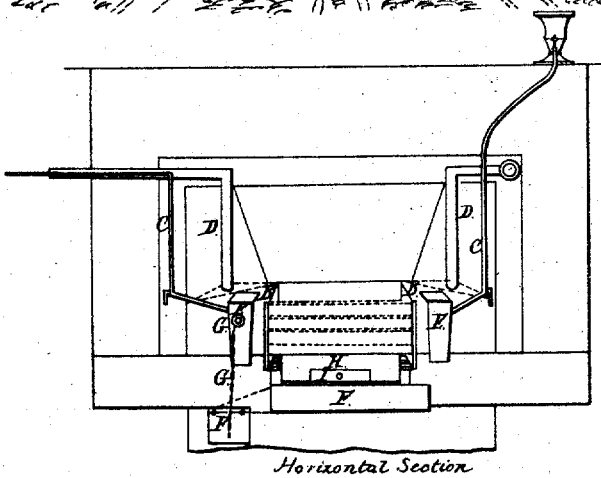
Figure 3:
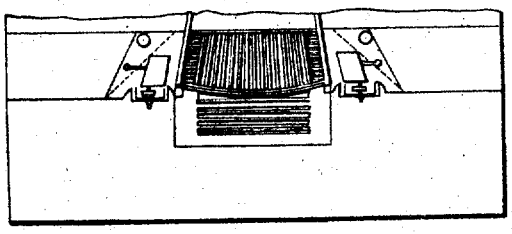

The Schedule referred to in these Letters Patent and making part of the same containing a description in the words of the said Charles Lane him self of his improvement in the fire Place and Grate for burning Wood and Coal To all people to whom these presents shall come. BE it known that I Charles Lane of Hingham in the County of Plymouth and Commonwealth of Massachusetts Esquire. have invented a new and use ful improvement in the construction of a fire Place & Grate for burning Wood and Coal. and that the following is a full and accurate descrip tion thereof. — (The external form of the fire place is the same as in common use — (Fig 1.) The bottom of the fire Place is formed by an iron Grate laid horizontally below the level of the hearth (Fig II. A) Front bars are inserted (Fig 1. ) and their lower part rests upon the upper plate of the ash pan herein after described. The ends of the front bars are inserted in grooves of iron placed perpendicularly & formed in plates which are to the back of the fire place. the exterior sur face of these plates is fluted and they together with the floor of the hearth at the ends of the horizontal grate before mentioned — the jambs — the back of the fire place — the plates in front continued from the ends of — the front bars to the jambs and horizontal plates above form air chambers at both ends of the grate which serve for generators of hot air. In these generators metal pots are in serted designed to contain water to be converted into vapour by the heat and transmitted from thence by tubes behind the jambs & through any part of the mantel piece to the room. the object of the vapour is to moisten the air of the room (See Fig II. Generators marked B. vapour tubes C. water pots E.). Hot air from the gen erators is transmitted to the Room by tubes inserted through the

9288 X sides thereof into the joints and thence through solid beds of Clay to the Room in such place as may be most convenient (Fig. II. D.) The pots containing water may be covered and surmounted by ornamental vases with tops containing a lateral aperture in each, so moveable as to regulate the transmission of vapour (Fig I. A). The draft of air to keep the wood or coal ignited is received from below the hearth through a horizontal tube closed at the inner end and opened by a register or air valve at the outer end. With this main tube other Tubes are connected which are placed horizontally & at right Angles thereto to conduct and distribute the air beneath & to the back part of the grate. the draft may be increased or diminished by a moveable register or air valve before mentioned which can be raised or lowered by a metal chain attached to a wheel with a knob (valve & tube Fig II. F. F. wheel and Knob F. II. G.) a stationary ash pan covered with a fine grate is placed in the hearth the top of which is level therewith to receive all the ashes which falls from the grate. This fine grate is moveable & when taken up the ashes in the pan may be emptied therefrom into a pit beneath through an aperture in the side of the pan (Fig II ash pan H. side aperture I.)

What I claim as my own invention and not previously known in the abovedescribed improvement is. First the sinking of the grate below the level of the hearth. by which means ignition sooner takes place and combustion is increased by excluding the coal from the external air from the Room & the convenience resulting by the deposite of ashes in the bottom of the grate – Second. the generators of hot air & the mode of transmitting it to the room – Third The production of vapour from the pots of water aforesaid & the transmission of the vapour to the Room to moisten the air – 4th the valve beneath the hearth and the pipes connected therewith. by which the draft of air may be increased or diminished & distributed – Fifth The ash pan upon the plan described as before mentioned.

Witness } Theodore Cushing
} Solomon Lincoln

Charles Lane.

[illegible] 8 1135

(Drawing.)